(12) United States Patent
Wallisch et al.

(10) Patent No.: US 11,498,781 B2
(45) Date of Patent: Nov. 15, 2022

(54) TRANSPORT SYSTEM (71) Applicant: Bausch + Ströbel Maschinenfabrik Ilshofen GmbH + Co. KG, Ilshofen (DE)

(72) Inventors: Manuel Wallisch, Vellberg (DE); Andreas Böhmike, Kirchberg (DE)

(73) Assignee: Bausch + Ströbel Maschinenfabrik Ilshofen GmbH + Co. KG, Ilshofen (DE)

( * ) Notice: Subject to any disclaimer, the term of this patent is extended or adjusted under 35 U.S.C. 154(b) by 0 days.

(21) Appl. No.: 17/260,877

(22) PCT Filed: Jul. 15, 2019

(86) PCT No.: PCT/EP2019/068945
§ 371 (c)(1),
(2) Date: Jan. 15, 2021

(87) PCT Pub. No.: WO2020/016146
PCT Pub. Date: Jan. 23, 2020

(65) Prior Publication Data
US 2021/0269260 A1 Sep. 2, 2021

(30) Foreign Application Priority Data
Jul. 17, 2018 (DE) ...................... 10 2018 211 839.6

(51) Int. Cl.
*B65G 54/02* (2006.01)
*F24F 3/167* (2021.01)

(52) U.S. Cl.
CPC ........... *B65G 54/02* (2013.01); *B65G 54/025* (2013.01); *B65G 2207/26* (2013.01); *F24F 3/167* (2021.01)

(58) Field of Classification Search
CPC ..... B65G 54/02; B65G 2207/26; B01L 1/025; B01L 1/04; F24F 3/167
See application file for complete search history.

(56) References Cited

U.S. PATENT DOCUMENTS 4,007,843 A 2/1977 Lubbers et al.
4,800,818 A * 1/1989 Kawaguchi .......... B23Q 7/1436
104/292

(Continued)

FOREIGN PATENT DOCUMENTS

DE 102008023339 12/2009
DE 102014102630 8/2015

(Continued)

OTHER PUBLICATIONS

International Application No. PCT/EP2019/068945, "International Search Report and Written Opinion", dated Nov. 5, 2019, 13 pages.

(Continued)

*Primary Examiner* — Gene O Crawford
*Assistant Examiner* — Keith R Campbell
(74) *Attorney, Agent, or Firm* — Kilpatrick Townsend & Stockton LLP (57) ABSTRACT

System comprising a clean room (50), a transport element (10) movable inside the clean room (50), and a drive element (30) of the transport element (10), which is arranged outside the clean room (50), wherein the transport element (10) is not connected to the drive element (30) and is only coupled to the drive element (30) or driven by the drive element (30) via contactless remote forces, wherein the transport element (10) is a separate element, in particular separate from the floor, ceiling, walls and/or other parts of the clean room (50), and in particular has no positive connection acting in any spatial direction to the floor, ceiling, walls and/or other parts (Continued)

of the clean room (50) and/or other elements. The invention also relates to a corresponding transport element (10).

17 Claims, 3 Drawing Sheets

(56) References Cited

U.S. PATENT DOCUMENTS

| | | | | |
|---|---|---|---|---|
| 6,045,319 | A * | 4/2000 | Uchida | H02K 41/031 |
| | | | | 414/676 |
| 7,472,786 | B2 * | 1/2009 | Komori | B65G 54/02 |
| | | | | 414/749.3 |
| 9,593,970 | B2 * | 3/2017 | Sinz | G01D 18/00 |
| 9,694,986 | B2 * | 7/2017 | Bierbooms | B65G 54/02 |
| 9,952,242 | B2 * | 4/2018 | Riether | B65G 54/02 |
| 10,654,660 | B2 * | 5/2020 | Ragan | B65G 45/10 |
| 10,723,563 | B2 * | 7/2020 | Gu | B65G 47/53 |
| 10,745,212 | B2 * | 8/2020 | Chi | B65G 37/005 |
| 2012/0031741 | A1 * | 2/2012 | Ishino | A47F 10/06 |
| | | | | 198/793 |

FOREIGN PATENT DOCUMENTS

| | | | |
|---|---|---|---|
| EP | 0597416 A1 | | 5/1994 |
| GB | 2133757 A | | 8/1984 |
| JP | 03288725 A | * | 12/1991 |
| JP | 03288725 A | | 12/1991 |
| JP | 0710273 A | | 1/1995 |

OTHER PUBLICATIONS

Chinese Application No. CN201980047801.4, Office Action dated Dec. 3, 2021, 6 pages.

German Application No. 102018211839.6, Search Report dated Oct. 19, 2021, 6 pages.

* cited by examiner

TRANSPORT SYSTEM

CROSS REFERENCE TO RELATED APPLICATION

This application is a U.S. national phase of International Patent Application No. PCT/EP2019/068945 filed on Jul. 15, 2019, which claims priority to German Patent Application No. 10 2018 211 839.6, filed in Germany on Jul. 17, 2018. The entire contents of both applications are hereby incorporated herein by this reference.

The invention relates to a system comprising a clean room, a transport element movable inside the clean room, and a drive element of the transport element, which is arranged outside the clean room, wherein the transport element is not connected to the drive element and is only coupled to the drive element or driven by the drive element via contactless remote forces.

A large number of clean room applications require transport devices for objects used in the clean room. In the field of pharmaceutical products manufacturing, for example, vials, syringes or the like are sterilised and brought to a filling station to be filled with a medical product and sealed in a sterile manner.

These objects are generally moved along fixed paths or are transported by movers/runners which move on fixed paths.

A fundamental consideration in this case is that a clean room is better if fewer interfaces or transitions are required at which something has to be transported from outside the clean room to inside the clean room. Accordingly, it is impractical to use drive solutions that have a significant need for transitions, openings or interfaces—for example, if the drive system would require a large number of electrical lines from outside the clean room into the clean room.

Since, at the same time, the volume in the clean room is very expensive, solutions that require a considerable amount of space inside the clean room are not necessarily an option. An example would be a series of small autonomous vehicles which are powered by electric motors and are regularly charged at a charging station. This would either require more lines or more battery mass in the clean room, both of which would be impractical.

For these reasons, rail systems are particularly preferred in which the drive is partially or completely outside the clean room.

An example of this according to the preamble of claim 1, with a fixed, predetermined process path or rail, is known from DE 10 2014 102 630 A1.

In such a system, however, the choice of movement is particularly inflexible, since both the corresponding rail inside the clean room and the corresponding rail outside the clean room must be laid differently.

The object of the invention is therefore to specify a transport system for objects in a clean room, which system requires few or preferably no openings and also allows the most flexible possible choice of movement.

This object is achieved by a system according to claim 1 and by a transport element according to claim 13. Advantageous configurations are the subject matter of the dependent claims.

A system according to the invention is characterised in that the transport element is a separate element, in particular separate from the floor, ceiling, walls and/or other parts of the clean room, and in particular has no positive connection to the floor, ceiling, walls and/or other parts of the clean room and/or other elements in any spatial direction.

The term "separate element" is to be understood here as meaning that, in the case of no coupling to the drive element and also no coupling to any object to be transported, the transport element has no connection whatsoever to parts of the clean room nor to other objects and elements, such that it can be easily removed from the clean room or moved inside the clean room by the drive element, optionally while overcoming a coupling force. In this case, no positive connection means that, apart from the connection to a possibly transported object, the transport element does not interlock with any other connection partner. Simply standing and/or lying on parts of the clean room and/or other elements does not, however, constitute a positive connection. Also not excluded is a connection of a transported object to other elements, with some play—for example, in which the transported object is connected to other elements via a hose.

Because the transport element is designed as a separate element, it can be moved freely outside the clean room, with a suitable movement of the drive element, provided that the distance to the drive element is not too great for the remote forces which are employed.

This allows in particular free movement in a plane or surface parallel to a plane or surface in which the drive element moves.

"Remote forces" are to be understood in this case as any forces that can work through a wall of a clean room with sufficient strength for coupling. Examples are magnetic, electrical and electromagnetic forces.

The drive and transport elements are preferably arranged on both sides of a flat wall of the clean room. As a result, a corresponding movement of the drive element outside the clean room allows free movement of the transport element in a surface parallel to the wall of the clean room.

In a preferred variant, the transport element comprises at least one roller which is rotatable about a roller axle for movement on a preferably flat running surface of the clean room. The roller axle runs substantially horizontal to the running surface. Thus, as far as the coupling to the drive element allows, the transport element can be moved freely along the running surface, such that flexible movement is possible in at least two dimensions.

Such a roller of the transport element is preferably designed to be self-steering, in particular by means of a rotatable mounting on a steering axle that is substantially perpendicular to the running surface. This can also be technically designed similarly to the mounting of rollers on conventional shopping trolleys. As a result, practically any changes in the movement on the running surface are possible, as a result of which the transport element can travel almost any path.

The roller axle is also preferably mounted to allow displacement parallel to the running surface, particularly preferably in a slot. This is advantageous when the direction of movement of the transport element is reversed, since then no steering or rotation of the rollers is required; instead, the rollers are shifted along the slot and the transport element can move in the opposite direction.

A smooth reversal of movement can be achieved in the variant having self-steering rollers, in particular via a suitable choice of the coupling forces to the drive element.

When self-steering rollers mounted in a slot are used, the slot and the steering axle are preferably designed in such a manner that the slot intersects a line extending along and through the steering axle at a point of intersection, wherein the slot preferably extends equally far on both sides of the point of intersection. This allows a further reduction in bucking behaviour, and thus a particularly rapid and flexible movement of the transport element.

In other variants, however, transport elements without rollers are also provided. According to the invention, any solution is suitable which keeps the transport element at a suitable distance from the drive element and at the same time allows low friction with a running surface or wall of the clean room.

For this purpose, it is also conceivable, for example, to create an air cushion by designing the transport element and/or a preferably flat running surface of the clean room in such a manner that an air cushion can be formed at least in parts of the region between the transport element and the running surface.

This is preferably done, for example, by arranging air nozzles in or on the running surface. The associated side of the transport element can be designed accordingly in order to offer suitable air resistance.

The coupling of the transport element and the drive element is preferably implemented by a magnetic device in both the transport element and the drive element. Magnetic and electromagnetic forces allow a relatively good coupling through a wall of a clean room if said wall is made of appropriate materials that do not themselves react to the magnetic forces or weaken them.

One or both magnetic devices preferably comprise permanent magnets. In particular, permanent magnets arranged in the form of a Hallbach array allow a relatively good coupling over a relatively large distance, so that a correspondingly greater wall thickness of the clean room is possible, which in principle can be advantageous for sealing the clean room.

The use of permanent magnets offers the advantage that no permanent power supply is necessary—which can be disadvantageous in particular in the case of the transport element, since the provision of a power supply in the clean room entails costs, and could make openings necessary.

In contrast, the use of electromagnets in the drive element is quite conceivable, since the disadvantages are fewer in such a case. However, permanent magnets are also preferred in the drive element.

The way in which the drive element can be moved is not predetermined. Above all, all possibilities that allow flexible movement of the drive element can be considered, because the maximum possible flexibility of the transport element can only be attained with a flexibly movable drive element.

For this purpose, it is particularly possible to use a cross table, a belt drive, a chain drive, an XTS and/or an electric motor, or to arrange the drive element on such an element and/or to connect it thereto. Alternatively, the drive element as a whole can also comprise one of the corresponding elements mentioned.

With a cross table, for example, the position of the drive element or the magnetic device, and thus the position of the transport element, can be completely controlled in two spatial directions along a plane, so that any movements of the transport element inside the clean room are possible in a plane parallel to the cross table.

Likewise, however, the drive element can also be arranged on a type of vehicle similar to the variant of the transport element described above, an electric motor then preferably being arranged in the drive element, which motor actively drives the wheels or rollers of the vehicle comprising the drive element. Complete, two-dimensional, flexible mobility of the transport element can thus also be ensured if the vehicle on which the drive element is arranged has an equally large, parallel surface available for movement.

In the latter variant, in principle, a plurality of transport elements can also be moved on the same surface, in which case a corresponding control which prevents a collision of vehicles with drive elements or transport elements is expedient.

The drive element preferably comprises at least one roller having features corresponding to the roller previously described with regard to the transport element, for movement on a preferably flat parallel running surface which runs parallel to the running surface of the clean room. In this case, a roller axle of the at least one roller of the drive element is preferably substantially horizontal to this parallel running surface.

The drive element is preferably a separate element and, in particular, does not have a positive connection that acts in any spatial direction to an outer side and/or other parts of the clean room and/or other elements. This ensures flexible mobility of the drive element and thus of the transport element.

The drive element and/or the transport element are preferably designed so that they can be decoupled. This is technically simple to implement, for example, by changing the distance between the drive element and the clean room, for example by means of sliding platforms on which the drive element is situated, or simply by sliding the drive element away from the clean room.

However, it is also conceivable that a device is provided in the clean room with which the distance between the transport element and the drive element can be increased so that decoupling takes place. For example, a region that can be raised or lowered in the clean room (for moving the transport element for decoupling) and/or outside the clean room (for moving the drive element for decoupling) is possible.

This can also be achieved simply by using a corresponding ramp or thickening of a wall in the clean room. On the one hand, this can be designed in such a way that the remote forces are additionally increased in order to allow the transport element to travel up the ramp onto a platform, for example. For this purpose, additional electromagnets provided in the clean room wall or drive element could be switched on or off, for example. Alternatively, a further drive element can also be placed adjacent to the actual drive element in order to increase the remote forces.

However, a ramp or thickening can also be used without corresponding aids. For instance, when the transport element travels onto the ramp at sufficient speed, it overcomes the remote forces through its own movement to such an extent that it travels up the ramp/thickening sufficiently far for decoupling. The drive element can then be moved away before the transport element rolls back again, for example. If the drive element is then moved back to the transport element, a new coupling happens automatically.

These different variants are advantageous for pairing transport elements or drive elements with each other differently, because different transport elements can have different properties—for example, other elements arranged on them, such as holders of different sizes, or different reactions to speed, acceleration or generally different shapes and thus different travel ranges.

Conversely, other drive elements could also be coupled to a transport element, for example if different acceleration forces or maximum speeds are advantageous for different tasks.

In particular, the system can also include correspondingly standardised coupling/decoupling stations, such that selectable drive elements and/or selectable transport elements can each be coupled to one another.

As a result, different work processes can be implemented in the same clean room by coupling the transport elements that are suitable for one work process, for example with appropriate holders, to drive elements, by carrying out the corresponding work process, and by then coupling to other transport elements suitable for the next work process.

In a system according to the invention, it can also be provided that no specific device is provided for moving the drive element. Rather, said drive element is moved, for example, by hand or conventional tools or conventional machines. In the simplest case, for example, the drive element is moved by hand.

In addition, a device for moving the or a drive element can be provided; at the same time, a decoupling of the drive element therefrom and/or a further drive element can be provided, without a device for said movement.

In this way, for normal operation, for example, the drive element and thus the transport element can be moved by means of the device. In contrast, in certain situations in which, for example, the transport element has to be moved to an unusual position, a movement can then be carried out by hand in order to reach a position with the transport element that cannot be reached by the device for movement.

It should also be emphasised that neither the floor of the clean room nor a flat surface need necessarily be between the transport element and the drive element. As such, a transport element could also be arranged on a side wall or also on an upper wall of the clean room, so that, for example, the transport element moves on the inner walls that do not form the floor of the clean room. Corner or edge regions of the clean room can also be designed so that there is a curved transition between walls so that, for example, the transport element can be moved from the floor onto a side wall.

The transport element can in particular also be equipped with various objects or elements to be transported, such as, for example, tongs, receptacles, slides, grippers or the like, in particular on an upper side.

For example, a transport element having a shell-like receptacle can be used to transport stoppers or the like from a delivery station to a place of use. This offers an improvement in the quality of the clean room compared to vibrating plates that are otherwise used for this purpose, because vibrating plates generate particles.

Although, in the case of a transport element having tongs or grippers, the transport element can comprise a small battery and a motor for operating the gripper, a solution for tongs, grippers and the like is preferred in which no battery or the like has to be arranged on the transport element.

This can be achieved, for example, by connecting a plurality of transport elements to the corresponding actuating ends of a pair of tongs. The relative movement of the transport elements can thus be used to control whether the other end of the tongs opens or closes, while the coordinated movement of the transport elements changes the position of the tongs.

In principle, a plurality of transport elements can advantageously be used for complex processes/operations. For example, a holder that can be raised and lowered can be formed by means of rods or arms that are rotatably held on two transport elements, and by a connecting rod/arm between the arms of the two transport elements.

This is because, as the transport elements move apart, the arms of the transport elements form an increasingly flat angle to the connecting arm, such that this connecting arm moves closer to the surface on which the transport elements move.

If the transport elements move towards one another again, the connecting arm is raised above this surface up to a maximum height when the two arms of the transport elements extend perpendicular to the surface.

In this way, a large number of complex tools/mechanisms can be operated by a plurality of coordinated, moved transport elements which are connected and/or interact via corresponding elements, without the need to provide a drive in the clean room.

In particular, tongs or gripping devices which can grasp a plurality of objects at once, such as vials, can also be formed and operated.

A further application can also be realised by providing a pusher on the transport element. According to requirements, the pusher can move other objects by means of the movement of the transport element, or block movement paths, for example at crossings of conveyor belts, for example, or to deflect material/objects into a certain region.

In principle, any nozzle, spray head, closure mechanism or the like can also be arranged on a transport element as an object to be transported, and movement thereof which is potentially caused by the play resulting from the hose or a similar material feed device can be corrected. For example, a movable spray head can easily be formed in this way.

Another application advantage arises when tools/replacement elements/etc. are used inside the clean room. In larger clean rooms, it may be the case that the tool/replacement elements/etc. can only be brought inside via an airlock at certain points.

If the tool/replacement elements/etc. are needed elsewhere, it/they must be laboriously passed from one sterile glove, permanently installed in the wall, to the next sterile glove, and on to the appropriate point.

On the other hand, if the tool/replacement elements/etc. can be placed into the receptacle of a transport element, the transport element can move precisely and flexibly to the place of use, where the tool/replacement elements/etc. can be picked up with the nearest sterile glove and used.

It is also possible to attach elements, the position of which should be adjustable, to one or more transport elements in order to allow an adjustment. For example, it makes sense to adjust the position of a dosing container depending on which dosing method is currently being used and how full the container is. In particular, a dosing container can also be tilted by means of a relative movement of corresponding transport elements, which can minimise the unusable residual quantity remaining in the container.

Furthermore, within the meaning of the invention, the term 'inside the clean room' is only to be understood as meaning that something is within the volume with corresponding clean room properties. For example, a non-clean room element that houses the drive element can extend into the clean room housing or inside the clean room housing.

If this has, for example, two longitudinal planes connected on both sides by a semi-circular curve as a shape, transport elements can move on one longitudinal plane in one direction, turn around at the first curve, and move back in the opposite direction into the starting position on the other longitudinal plane after the second curve. A type of conveyor belt is thus formed by means of the transport elements. Such a non-clean room element can also extend completely inside the clean room, because one cable connection that supplies internal drive elements with energy is sufficient.

It is also conceivable, for example, to equip a dosing container with transport elements located in the clean room and drive elements located in the non-clean room in order, for example, to move a magnetic paddle in order to stir the liquid in a dosing container by means of the paddle in the dosing container and the movement of the transport elements. In this case, additional magnets may have to be attached to the transport element for coupling to the paddle.

The object according to the invention is also achieved by a transport element having at least one roller rotatable about a roller axle, the transport element comprising a magnetic device for magnetic coupling to a drive element, wherein the at least one roller of the transport element is self-steering. This is preferably achieved by a rotatable mounting on a steering axle that is substantially perpendicular to a plane of movement.

Such a transport element arranged on a wall of a clean room can be moved flexibly, provided that suitable magnetic forces are exerted, for example by arranging a corresponding drive element on another side of the wall of the clean room and/or by providing corresponding devices in the interior of the wall to be able to flexibly change the magnetic forces acting on the drive element.

The transport element according to the invention can also be designed in each case in accordance with the properties described above with regard to the transport element.

Likewise, the transport element according to the invention can be used not only in the system according to the invention, but also by means of drive elements located in the clean room. Although this results in disadvantages with regard to the clean room quality, complex movement sequences can also be carried out at points in the clean room where the arrangement of a non-clean room element is out of the question.

Of the several embodiments or preferred embodiments described above, a number of specific embodiments are explained below with reference to the drawings.

Figure 1:
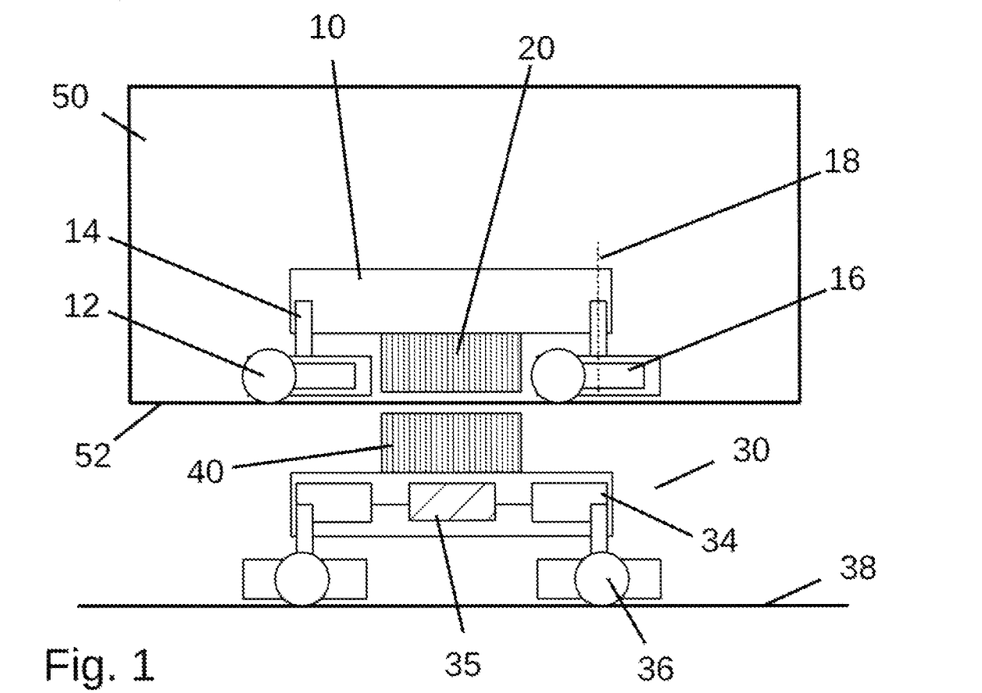
FIG. 1 is a schematic side view of a system according to the invention, comprising a clean room, a drive element arranged outside the clean room, and a transport element according to the invention arranged inside the clean room.
Figure 2:
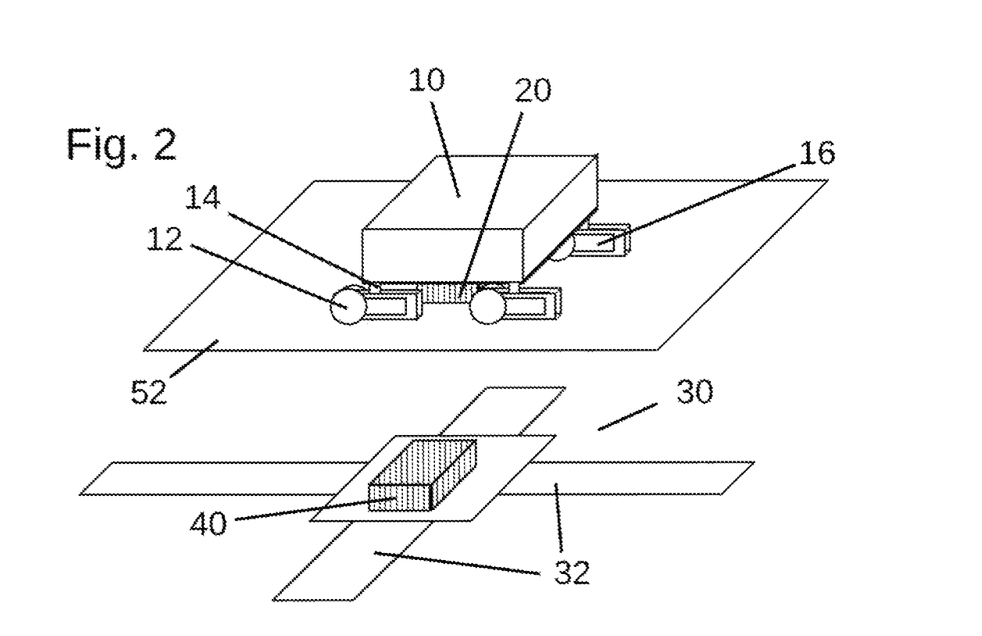
FIG. 2 is a schematic perspective view of a transport element according to the invention as part of a system according to the invention, wherein the drive element, unlike in FIG. 1, is a cross table.

A transport element 10 according to the invention comprises a plurality of rollers 12, for example four, which are self-steering as the result of being mounted on a steering axle 14 perpendicular to the plane of movement.

By mounting a roller axle of the roller 12 in a slot 16 parallel to the plane of movement, a jolt-free reversal of the direction of movement of the transport element 10 is possible if the rollers 12 are pressed with sufficient contact pressure against a corresponding running surface.

The slot 16 intersects the extension of an imaginary line 18 which runs centrally through the steering axle 14. Because the slot 16 extends the same distance on both sides of the intersection with this line 18, a complete reversal of movement is possible with consistent travel behaviour.

In other variants, the slot 16 can also extend to different lengths on both sides, or it can also not intersect the line 18 at all. These different conceivable variants react differently to different changes in the direction of movement, and are to be selected in accordance with the most frequently occurring changes in the direction of movement. For example, the variant without intersection of the slot 16 with the line 18 is advantageous if the transport element 10 has a preferred front direction and the slot 16 is primarily intended to ensure that the rollers are entrained without jerking when the direction of movement is changed rapidly and sharply.

The drawings do not show that the transport element 10 has further elements which are generally arranged on the upper side and which serve to engage with elements to be transported or driven. This can be, for example, a container, a holder, a gripper or the like, but also a simple pusher that extends from the top of the transport element 10 perpendicularly, or at an angle in a suitable manner.

The transport element 10 according to the invention further comprises a magnetic device 20 for coupling to a drive element 30 by means of contactless remote forces.

A system according to the invention comprises a transport element 10 according to the invention, a clean room 50 and a drive element 30.

In the example shown in FIG. 1, the transport element 10 is arranged on the wall 52 of the clean room 50, such that this wall 52 serves as a running surface 52 of the transport element 10.

The drive element 30, which comprises the magnetic device 40 for coupling to the magnetic device 20 of the transport element 10, is arranged on the opposite side of this wall 52. The two magnetic devices 20 and 40 are each arranged on the transport element 10 and drive element 30 in such a way that the distance between the two is relatively small, since then the coupling is greatest, or correspondingly weaker magnetic devices 20, 40 are needed to achieve adequate coupling. Ideally, the distance between the magnetic device 20 and/or the magnetic device 40 and the wall 52 is as minimal as the manufacturing tolerance and the accuracy of the movement of the transport element 10 and drive element 30 allow, such that there is no contact between the magnetic devices 20, 40 and the wall 52. This can of course also depend on whether the transport element 10 is loaded with additional weight, for example because it transports or pushes correspondingly heavy objects.

The drive element 30 is designed as an autonomous vehicle in the variant shown in FIG. 1, and accordingly comprises electric motors 34, a steering/controller 35, and rollers 36 which are driveable and rotatable by means of the electric motors 34 and which move on a parallel running surface 38 running parallel to the wall 52.

As such, the transport element 10 can be moved completely in both spatial directions on the running surface 52 without the need for openings and/or without the need for a complex drive system on the transport element 10.

The dimensioning shown is of course only schematic, and in practical applications the running surface 52 and the parallel running surface 38 can each be dimensioned such that a plurality of transport elements 10 and drive elements 30 coupled thereto move in the system according to the invention. A corresponding controller is then of course required which appropriately coordinates the movement of the drive elements 30 with one another.

The drive elements 30 also have an accumulator or the like that can be charged in a charging station (not shown). Since the drive elements 30 are outside the clean room 50, the required additional size and the space for the charging station are irrelevant for the structure and costs of the clean room 50.

A decoupling region, for example in the form of a lift, can also be provided in the running surface 38, by means of which a drive element 30 is moved downwards, whereby the coupling to the associated transport element 10 ends due to the increased distance.

The general advantage of the systems according to the invention is that a transport element 10 according to the invention can easily be removed from the clean room, the running surface 52 can be disinfected and cleaned, and the transport element 10 can be serviced and replaced.

FIG. 2 shows an alternative structure of the drive element 30. In the embodiment shown, this is designed as a cross table 32 on which the magnetic device 40 is arranged. A cross table 32 allows particularly precise control of the movements; and accordingly the system in FIG. 2 has a higher precision when moving the transport element 10. However, generally only one cross table 32 can be arranged to match a movement region of an associated transport element 10, such that the simultaneous movement of a plurality of transport elements 10 in the same region is mostly not possible.

In the schematic illustration of FIG. 2, only one wall element 52 of the clean room 50 is shown and the distance between the magnetic device 40 and the underside of the wall element 52 is shown larger than it is in practice.

As can be seen, the transport element 10 according to the invention in the variant in FIG. 2 is constructed substantially the same as in the variant in FIG. 1. This means in particular that the transport element 10 according to the invention can be coupled to different drive elements 30 depending on the planned application, such that the optimal drive element 30 for the application can be selected in each case. In particular, a different transport element 30 can be arranged in a clean room 50 with a transport element 10 according to the invention, even without opening the clean room 50; this significantly increases flexibility, since in principle different drive elements 30 can be used in direct succession for different process sequences.

Figure 3A:
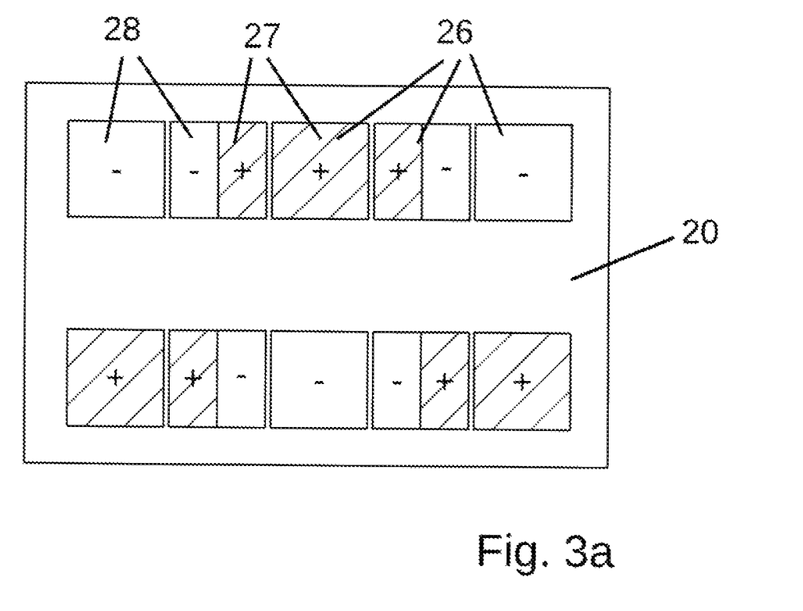
FIGS. 3a to 3c are schematic views from below of various arrangements of magnets within a magnetic device.
Figure 3B:
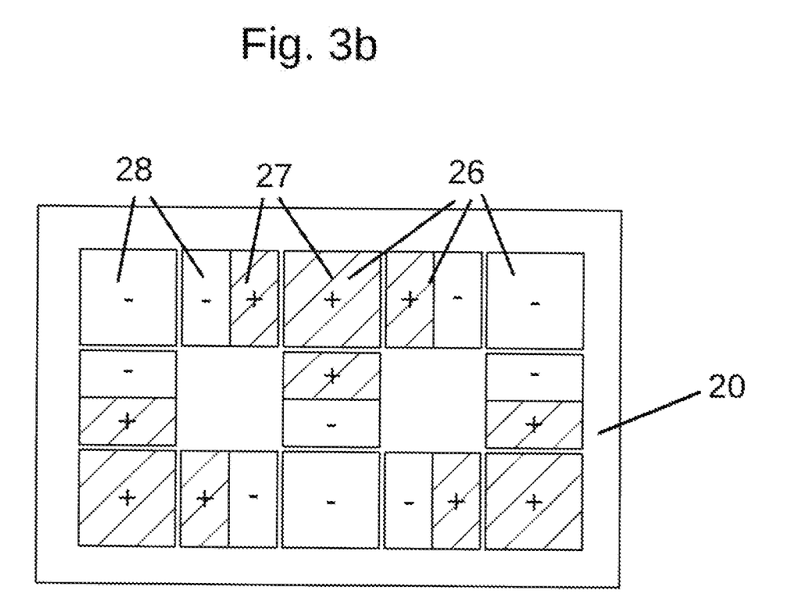
Figure 3C:
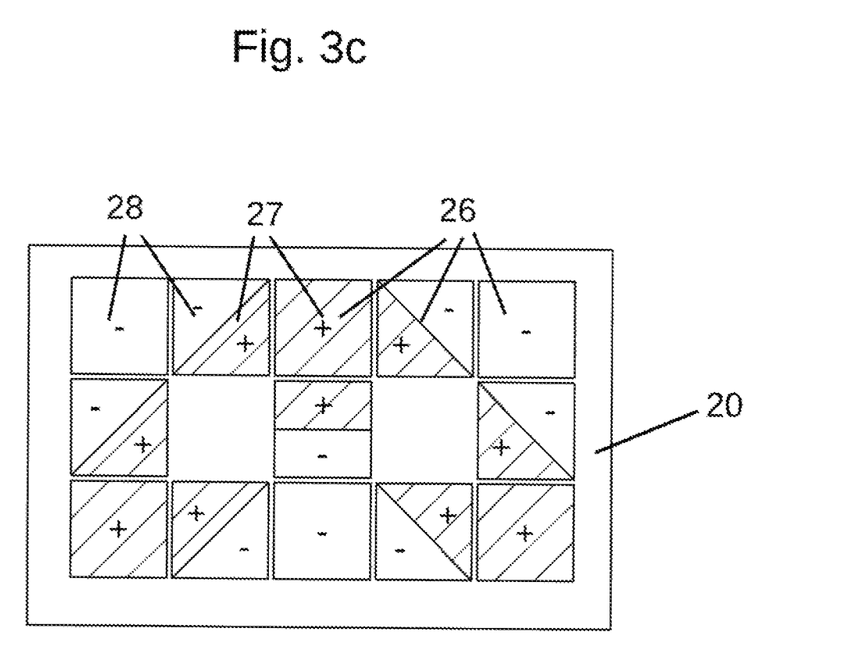

In FIGS. 3a to 3c, different designs of the magnetic device 20 are shown as Hallbach arrays. In this case, the viewing direction is from below the wall 52 into the clean room 50.

In a Hallbach array, as shown in FIGS. 3a to 3c, magnets 26, in particular permanent magnets 26, with different pole directions are arranged adjacent to each other.

In this case, the positive pole 27 and negative pole 28 in FIG. 3a, in a central magnet in a row at the top in the drawing, are oriented in such a manner that the connecting line is orthogonal to the running surface 52. In addition, the adjacent magnets 26 have a magnet direction or pole direction rotated by 90°, such that the positive pole 27 of each of the adjacent magnets 26 faces towards the central magnet. At the ends of the row, there is a magnet 26 with a positive pole 27 and a negative pole 28 reversed as with the central magnet 26, and thus also with a pole direction rotated by 90° with respect to the adjacent magnets 26.

Such a row could form the magnetic device 20 by itself. However, it is advantageous to form a further row of magnets 26 which is offset, with positive poles 27 and negative poles 28 thereof each reversed compared to the row arranged above in FIG. 4a. This optimises the force of the magnetic field and thus the precision of the guidance.

The rows of magnets 26 could also be longer than five magnets, with adjacent magnets each having pole directions rotated by 90° to one another. Furthermore, more than two rows could also be used. This depends substantially on the size of the magnets 26 used and on the size of the transport element 10 and the objects to be moved—as well as on the magnetic device 20.

FIG. 3b also shows the option in which rows are connected by means of magnets 26 rotated again by 90° with respect to their neighbours, and a grid of magnets 26 is formed. This grid, as well, can also include more rows and columns than the two or three shown.

An angle of rotation of 90° between adjacent magnets 26 is usually preferable. However, with special sizes, distances and magnet types, other angles can also be advantageous.

An example is the grid of magnets 26 shown in FIG. 3c, in which adjacent magnets are rotated alternately by 45° and 135°.

There does not even have to be the same angle of rotation everywhere, but rows or grids of magnets 26 can be contemplated in which the angle of rotation is 45°, so that a complete 180° rotation of the pole direction is only possible via five magnets 26—instead of three, as shown. Furthermore, individually varied angles of rotation are also conceivable, which then result in a total angle of rotation of a multiple of 180° at the end of the given row or column.

The invention claimed is:

1. A system comprising:
  a clean room;
  a transport element movable inside the clean room;
  a drive element of the transport element arranged outside the clean room, wherein the transport element is only coupled to the drive element via contactless remote forces; and
  wherein the transport element is a separate element from any part of the clean room, having no positive connection to the clean room or to objects in the clean room.

2. The system according to claim 1, wherein the drive element and the transport element are arranged on opposite sides of wall of the clean room.

3. The system according to claim 1, wherein the transport element comprises at least one roller which is rotatable about a roller axle for movement on a running surface of the clean room, the roller axle running substantially horizontal to the running surface.

4. The system according to claim 3, wherein the at least one roller of the transport element is self-steering due to being rotatably mounted on a steering axle which is substantially perpendicular to the running surface.

5. The system according to claim 3, wherein the roller axle is mounted in a slot to allow displacement parallel to the running surface.

6. The system according to claim 5, wherein the at least one roller of the transport element is self-steering due to being rotatably mounted on a steering axle which is substantially perpendicular to the running surface; and
  wherein the slot intersects a line which extends along and through the steering axle at a point of intersection.

7. The system according to claim 1, wherein the transport element comprises a first magnetic device and the drive element comprises a second magnetic device, and wherein the first magnetic device and the second magnetic device coupling of the drive element and the transport element.

8. The system according to claim 7, wherein one or both magnetic devices comprises permanent magnets.

9. The system according to claim 1, wherein the drive element is arranged on at least one of a cross table, a belt drive, a chain drive, or an electric motor.

10. The system according to claim 1, wherein the drive element comprises at least one roller for movement on a flat parallel running surface which runs parallel to the running surface of the clean room, a roller axle of the at least one roller of the drive element running substantially horizontal to the parallel running surface.

11. The system according to claim 1, further comprising at least a second transport element, wherein the transport element and the second transport element each engaged with an object to be transported, such that a synchronous movement of the transport element and the second transport element changes the position of the object, while asynchronous movement of the transport element and the second transport element relative to each other varies a property of the object.

12. The system according to claim 1, wherein the drive element does not have a positive connection acting in any spatial direction to an outer side and/or other parts of the clean room and/or other elements.

13. A transport element movable inside a clean room, wherein the transport element comprises:
   at least one roller which is rotatable about a roller axle; and
   a magnetic device for magnetic coupling to a drive element, wherein the at least one roller of the transport element is self-steering due to being rotatably mounted on a steering axle which is substantially perpendicular to a plane of movement, wherein the roller axle is mounted in a slot to allow displacement of the roller axle along the slot and parallel to the plane of movement.

14. The transport element according to claim 13, wherein the slot intersects a line extending along and through the steering axle at a point of intersection, wherein the slot extends equally far on both sides of the point of intersection.

15. The system according to claim 8, wherein the permanent magnets are in the form of a Halbach array.

16. The system according to claim 1, wherein the drive element comprises at least one of a cross table, a belt drive, a chain drive, or an electric motor.

17. The system according to claim 1, further comprising at least a second transport element, wherein the transport element and the second transport element are each engaged with an object to be transported, such that a synchronous movement of the transport element and the second transport element changes the position of the object, while asynchronous movement of the transport element and the second transport element relative to each other activates or deactivates a function of the object.

* * * * *